US007125104B2

(12) United States Patent
Tomita

(10) Patent No.: US 7,125,104 B2
(45) Date of Patent: Oct. 24, 2006

(54) LIQUID-DISCHARGING HEAD, LIQUID-DISCHARGING DEVICE, AND METHOD OF PRODUCING THE LIQUID-DISCHARGING HEAD

(75) Inventor: Manabu Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 141 days.

(21) Appl. No.: 10/497,950

(22) PCT Filed: Oct. 8, 2003

(86) PCT No.: PCT/JP03/12855

§ 371 (c)(1),
(2), (4) Date: Jun. 7, 2004

(87) PCT Pub. No.: WO2004/033211

PCT Pub. Date: Apr. 22, 2004

(65) Prior Publication Data

US 2005/0128253 A1 Jun. 16, 2005

(30) Foreign Application Priority Data

Oct. 9, 2002 (JP) ............................ 2002-295594

(51) Int. Cl.
*B41J 2/05* (2006.01)
*G01D 5/27* (2006.01)

(52) U.S. Cl. ........................................ 347/56; 216/27

(58) Field of Classification Search ............ 347/56–59; 438/460; 83/27, 44
See application file for complete search history.

(56) References Cited

U.S. PATENT DOCUMENTS

| | | | | |
|---|---|---|---|---|
| 6,468,437 | B1 * | 10/2002 | Kashino et al. | 216/27 |
| 6,573,157 | B1 * | 6/2003 | Sato | 438/462 |
| 2002/0102918 | A1 * | 8/2002 | Pugliese et al. | 451/38 |

FOREIGN PATENT DOCUMENTS

| | | |
|---|---|---|
| JP | 60-149151 | 8/1985 |
| JP | 62-89321 | 4/1987 |
| JP | 10-202889 | 8/1998 |

* cited by examiner

*Primary Examiner*—Lamson Nguyen
*Assistant Examiner*—Lisa M. Solomon
(74) *Attorney, Agent, or Firm*—Sonnenschein Nath & Rosenthal LLP

(57) ABSTRACT

The present invention is applicable to, for example, a thermal printing head to form shallow grooves M by removing the insulating films 21, 24, 30, and 33 along at least the rows of the energy transducers.

3 Claims, 9 Drawing Sheets

LIQUID-DISCHARGING HEAD, LIQUID-DISCHARGING DEVICE, AND METHOD OF PRODUCING THE LIQUID-DISCHARGING HEAD

BACKGROUND OF INVENTION

The present invention relates to liquid-ejecting heads, liquid-ejecting apparatuses, and methods for manufacturing liquid-ejecting heads, and relates to, for example, a thermal printing head. According to the present invention, insulating films on wafers are removed to form shallow grooves along at least rows of energy transducers. In this manner, the grooves can prevent various types of damage due to cracking and chipping even during high-speed dicing.

In printers provided with printing heads ejecting ink droplets, energy transducers convert electric energy into energy for ejecting ink. Heating devices are used as the energy transducers for thermal printing heads.

In thermal printing heads, heating devices heat ink contained in ink chambers to generate bubbles, and the ink droplets are ejected from nozzles by the pressure of bubbling.

In such a printing head, heating devices and a driving circuit are integrated densely on a semiconductor substrate, resulting in high-resolution printing. Moreover, the heads are efficiently produced through semiconductor manufacturing processes: Heating devices and driving circuits for a plurality of chips are integrated on a semiconductor substrate, or wafer; the substrate is cut into chips; and ink chambers and nozzles are provided on the chips.

FIG. 1 is a plan view of a semiconductor substrate manufactured by a known process. In the process, a 6-inch silicon wafer 1, for example, is sequentially processed to form, at a predetermined pitch, rectangular regions 2, each of which includes heating devices and a driving circuit for one chip. In FIG. 1, the size of the regions 2 is illustrated larger than their actual size relative to the silicon wafer 1.

FIG. 2 shows cutting regions 3 formed between the regions 2 during processing of the silicon wafer 1 in a manufacturing process of the printing heads. As shown in a cross-sectional view of FIG. 3, a protective film 4 for preventing penetration of ink, and an insulating film 5 under the protective film 4 are removed from the silicon wafer 1 to form cutting region 3 wider than a blade used for dicing. In the example shown in FIG. 3, the cutting region 3 has a width of 140 μm for a blade width of 50 μm.

In the process, the silicon wafer 1 is held on a stage of a dicing machine. The stage or the blade rotating at high speed is driven such that the blade cuts the silicon wafer 1 substantially at the center of the cutting regions 3 into chips. In this step of fabricating printing heads, a stream of deionized water is provided to the areas to be cut in order to cool the blade and wash away cutting debris.

In this dicing step, an impact due to increasing the cutting speed causes cracking and chipping at the chip edges. FIG. 4 is a plan view of an edge of the chip in FIG. 3. The chip is formed by cutting the silicon wafer 1 with a blade 50 mm in diameter rotating at a speed of 30,000 rpm and fed at a speed of 30 mm/sec, and has chipped portions of approximately 17 μm. The relative speed between the blade- and the silicon wafer 1 under these conditions is given by 50 [mm]×3.14×60×30,000/1,000,000=282 km/h. The collision of the blade with the silicon wafer at high speed is a possible cause for cracking and chipping.

In a printing head, ink contained in ink chambers is heated by the heating devices on the chip, and droplets thereof are ejected as a result. When cracking or chipping occurs in the chip, the ink can penetrate into the chip and may cause instability of semiconductor performance. When ink is introduced to the ink chambers from a side face of the chip, the fluid resistance in the ink passage connected to the ink chambers may change due to cracking or chipping, resulting in slight changes in print quality. Furthermore, when the chipping fragments remain on the chip surface, these fragments can damage the chip surface during forming of the ink chambers. In the event that the damage from the chipping fragments reaches inside the chip, ink will penetrate into the chip, and a wiring pattern or the like may be damaged in the case of severe damage.

To prevent cracking and chipping of the chip, the cutting speed in the process of manufacturing printing heads should be slower than that in a process of manufacturing standard integrated circuits.

A method for dicing standard integrated circuits is disclosed in, for example, Japanese Unexamined Patent Application Publication No. 6-275713, in which grooves deeper than the depth of devices, such as transistors, are formed on both sides of the cutting regions in order to prevent the propagation of cracks during cutting.

In a manufacturing process of printing heads in which a 6-inch silicon wafer is cut along 60 longitudinal lines and 12 transverse lines to form chips at a cutting speed of 5 mm/sec, the time required for cutting is 60×12×(150/5)/3,600=6 hours. Thus, the known dicing step for cutting chips at low speed to avoid cracking and chipping disadvantageously takes time.

When the method disclosed in Japanese Unexamined Patent Application Publication No. 6-275713 is applied as a solution for this problem, it requires an additional etching step to form grooves deeper than the devices. Besides, since it is not possible to avoid the chipping fragments, damage to the chip surfaces from the fragments is inevitable.

SUMMARY OF THE INVENTION

In view of the above-mentioned problems, the present invention provides a liquid-ejecting head, a liquid-ejecting apparatus, and a method for manufacturing the liquid-ejecting head in which various types of damage due to cracking and chipping can be prevented even during high-speed dicing.

To solve these problems, the present invention is applied to a liquid-ejecting head ejecting droplets by driving energy transducers in which at least one groove is formed, parallel to at least the side face along which the energy transducers are provided, by removing insulating films.

In accordance with the structure of the present invention, the present invention can be applied to liquid-ejecting heads ejecting droplets by driving the energy transducers, for example, liquid-ejecting heads which eject ink droplets, dye droplets, droplets for forming protective layers, or the like; liquid-ejecting heads for microdispensers, measuring units, or testing units which eject droplets of reagents or the like; and liquid-ejecting heads for pattern-drawing units which eject droplets of agents that protect target components during etching. In accordance with the structure of the present invention, since at least one groove is formed, parallel to at least the side face along which the energy transducers are provided, by removing insulating films, the grooves can be formed simultaneously in a step of patterning the insulating films. Thus, the grooves are efficiently formed without increasing the number of processing steps. Such grooves prevent the propagation of cracking and chipping to the chips, reduce the size of chipping fragments, prevent penetration of liquid into the chips through the cracked or chipped portions, reduce the change in fluid resistance in the ink passage, and reduce the damage due to chipping fragments. As mentioned above, various types of damage due to cracking and chipping can be prevented by the grooves even during high-speed dicing.

The present invention is also applied to a liquid-ejecting apparatus ejecting droplets by driving energy transducers on a liquid-ejecting head. The head chip includes at least one groove that is formed, parallel to at least the side face along which the energy transducers are provided, by removing insulating films.

In accordance with the structure of the present invention, the present invention can provide a liquid-ejecting apparatus in which various types of damage due to cracking and chipping can be prevented even during high-speed dicing.

The present invention is also applied to a method for manufacturing liquid-ejecting heads ejecting droplets by driving energy transducers. Before a cutting step, the method includes a step of removing insulating films to form grooves parallel to at least the side face along which the energy transducers are provided.

In accordance with the structure of the present invention, the present invention can provide a method for manufacturing the liquid-ejecting heads in which various types of damage due to cracking and chipping can be prevented even during high-speed dicing.

DETAILED DESCRIPTION OF THE PRESENTLY PREFERRED EMBODIMENTS

Preferred embodiments of the present invention will now be described in more detail while referring to the accompanying drawings.

1. First Embodiment

1.1 Structure of First Embodiment

Figure 5:
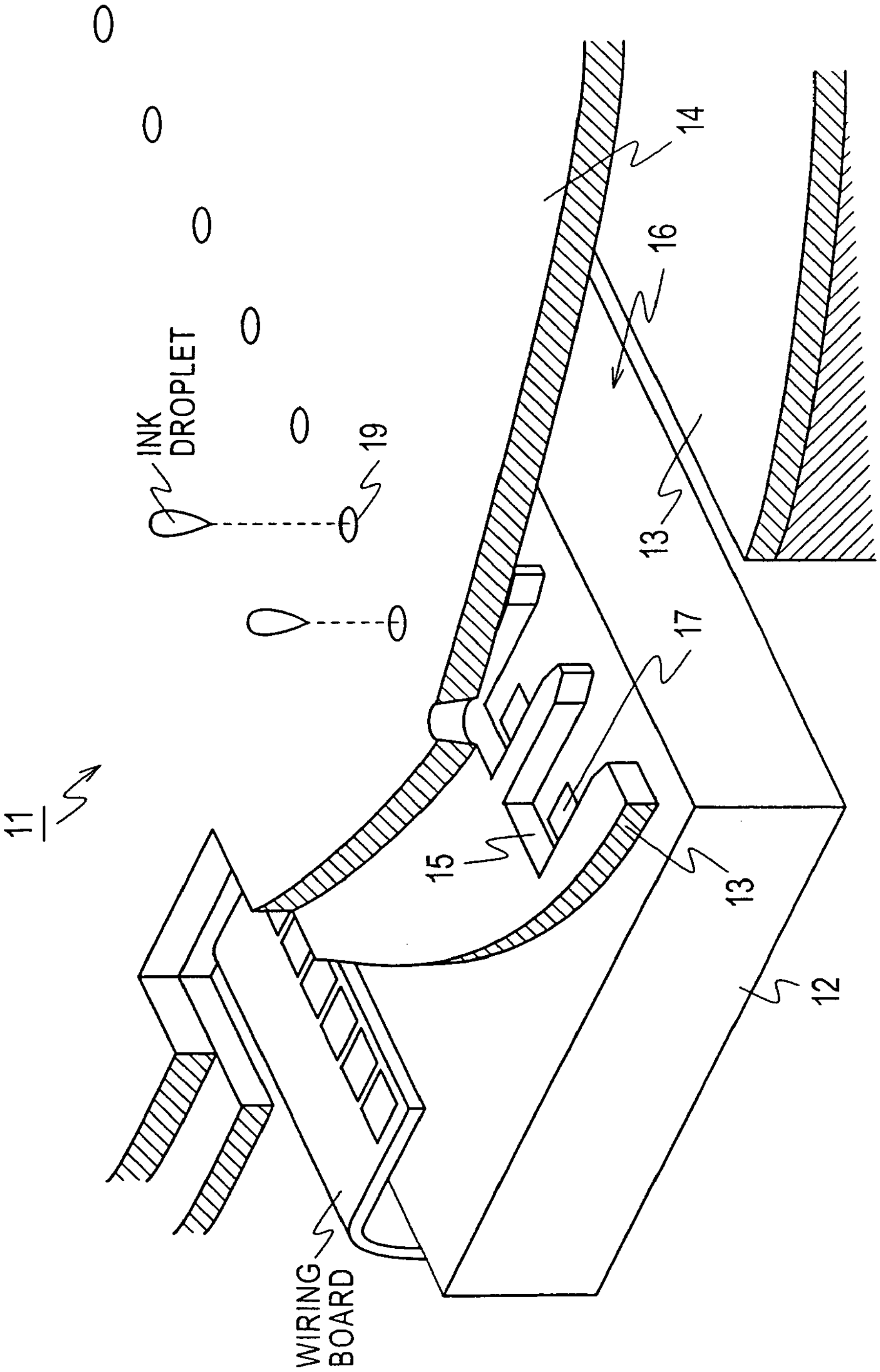
FIG. 5 is a perspective view of a printing head according to a first embodiment of the present invention.

FIG. 5 is a perspective view of a printing head applied to a printer according to an embodiment of the present invention. The printer according to this embodiment ejects ink droplets onto paper or the like by driving energy transducers, namely heating devices, provided on a printing head 11, and prints images or the like. The printing head 11 is formed by sequentially laminating a dry film 13 and an orifice plate 14 on a head chip 12.

The head chip 12 is formed by cutting a silicon wafer processed by IC-technology, and a plurality of heating devices 17 and a driving circuit for driving the heating devices 17 are integrated therein. The heating devices 17 are disposed at a predetermined pitch on the head chip 12. The dry film 13 is composed of organic resin. After the dry film 13 is press-bonded to the head chip 12, the dry film is partly removed to form ink chambers 15 and an ink passage 16, and then is cured. The orifice plate 14 has a predetermined shape, is provided with small ink-ejecting outlets, namely nozzles 19, above the respective heating devices 17 on the head chip 12, and is bonded to the dry film 13. Thus, the printing head 11 includes the ink chambers 15 and the ink passage 16 formed by the dry film 13 and the orifice plate 14 for the head chip 12.

In this embodiment, the heating devices 17 are disposed on the head chip 12 along a side face of the chip. In the printing head 11, the dry film 13 has a comb shape so that the inlets of the ink chambers 15 are open to the side along which the heating devices 17 are disposed, and the ink passage 16 is also formed along the side of the inlet openings. Thus, in the printing head 11, ink is supplied from the side of the head chip 12 and ink droplets are ejected by driving heating devices 17 on the head chip 12.

Figure 6:
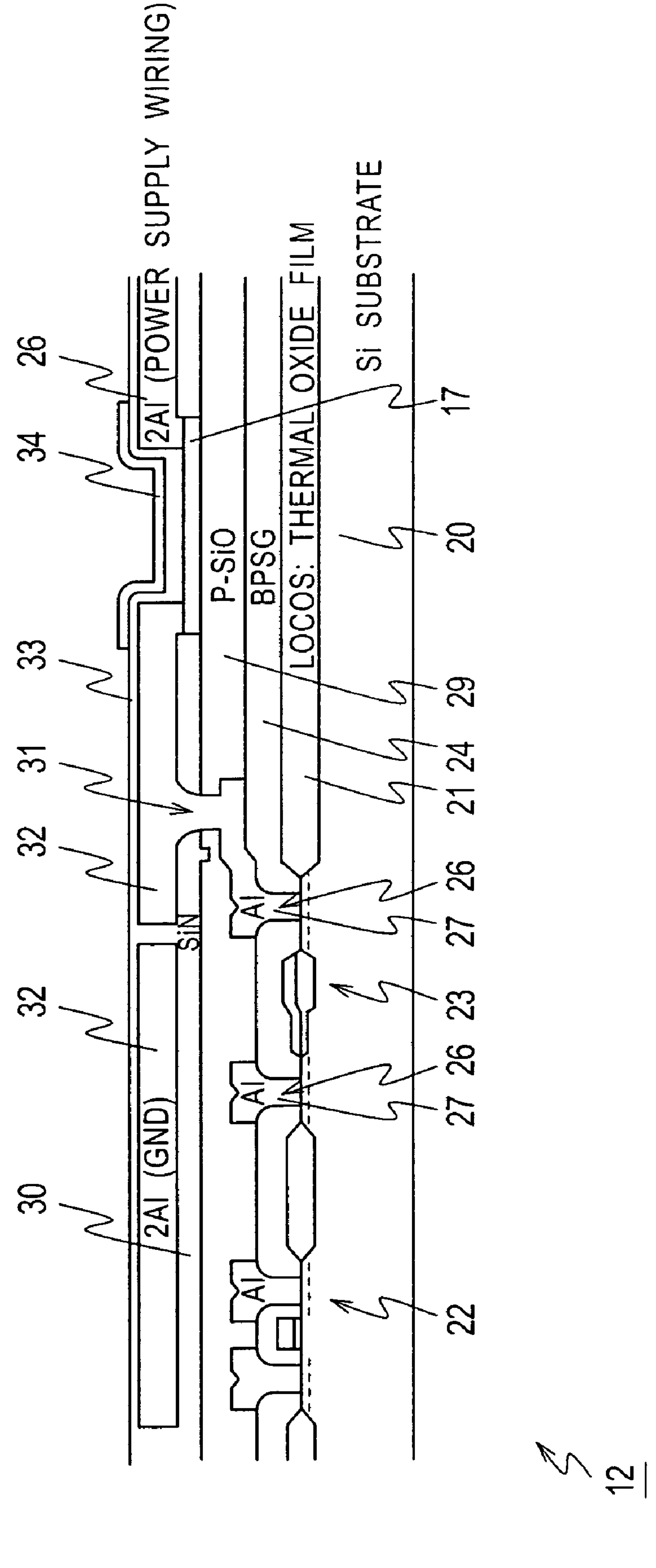
FIG. 6 is a cross-sectional view of a head chip applied to the printing head in FIG. 5.

FIG. 6 is a cross-sectional view showing the structure of the head chip 12. In the head chip 12, a silicon nitride ($Si_3N_4$) film is deposited and patterned on a silicon substrate 20 obtained from a silicon wafer, and a thermal oxidizing step is then performed with the silicon nitride ($Si_3N_4$) film functioning as a mask to form a thermal silicon oxide film 21, namely a region for isolating devices (LOCOS: local oxidation of silicon). In the head chip 12, devices are isolated by the regions for isolating devices, and MOS (metal-oxide-semiconductor) transistors 22 and 23 are formed.

In the head chip 12, a first insulating interlayer 24 composed of silicon oxide is formed, and contact holes 26 are then formed by patterning the insulating interlayer 24. Subsequently, a film of a material for forming a wiring pattern is formed, and is etched to form a first wiring pattern 27. In the head chip 12, the first wiring pattern 27 formed in the above-mentioned step connects a transistor 22 with another transistor 23 to form a logical circuit, and then the logical circuit and the switching transistor 23 which drives the heating device 17 are connected.

In the head chip 12, a second insulating interlayer 29 composed of silicon oxide is formed, and a laminated resistor film is then patterned to form the heating device 17. Subsequently, an insulating film 30 composed of silicon nitride is deposited and is etched to form a contact hole 31. Furthermore, a film of a material for forming a wiring pattern is formed, and is patterned to form a second wiring pattern 32. In the head chip 12, the second wiring pattern 32 forms lands for wiring a power supply, a ground, and various driving signals. These lands are then connected to the driving circuit and the heating devices 17, so that the heating devices 17 are connected to the transistor 23.

After an insulating film 33 composed of silicon nitride is formed, the head chip 12 is heat-treated at a temperature of 400° C. for 60 minutes in an atmosphere of nitrogen gas containing 4% hydrogen or in an atmosphere of 100% nitrogen. Thus, the performance of the transistors 22 and 23 of the head chip 12 is stabilized, and the connection between the first wiring pattern 27 and the second wiring pattern 32 is stabilized to reduce the contact resistance. The heat-treatment is carried out by annealing to relieve the residual stress in the insulating interlayer 29 or the like.

In the head chip 12, the insulating film 33 is partly removed to expose the lands for the power supply, the ground, and various driving signals, and a tantalum anti-cavitation layer 34 is formed by sputtering. Then, after a dicing step to separate individual chips, the head chip 12 is integrated in the printing head 11, as described in FIG. 5.

Figure 7:
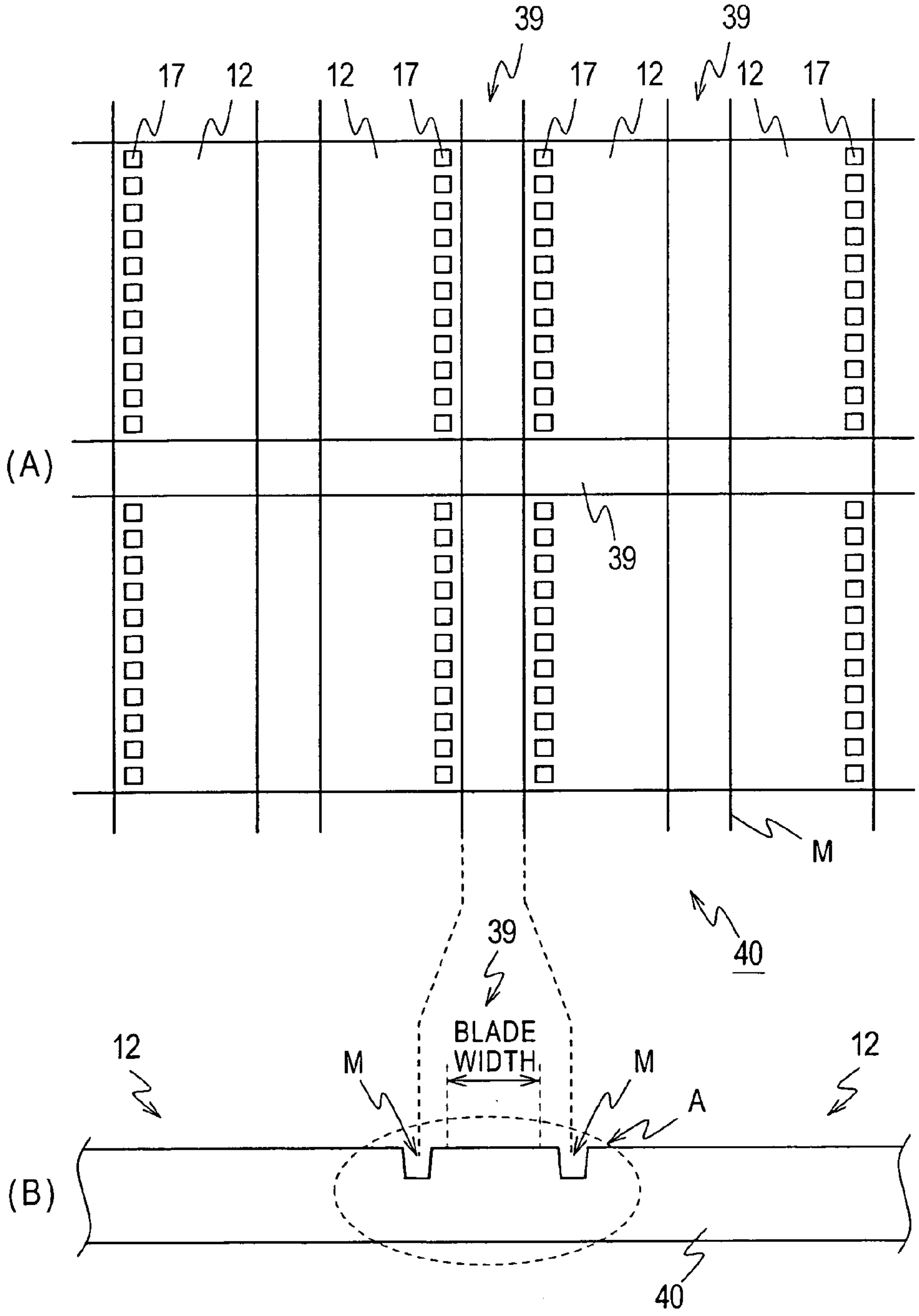
FIGS. 7(A) and 7(B) are a plan view and a cross-sectional view, respectively, illustrating the layout of the head chips shown in FIG. 6 on the silicon wafer.

FIG. 7(A) is a plan view showing the layout of the head chips 12 on a silicon wafer 40 formed in the above-mentioned manner. The heating devices 17 on the head chip 12 face those on another adjacent head chip 12 on the silicon wafer 40. The regions between the head chips 12 are allocated for cutting regions 39. As shown in FIG. 7(B), shallow narrow grooves M away from the devices are formed along the cutting regions 39 on the silicon wafer 40. According to this embodiment, the energy transducers, namely heating devices 17, are disposed along one of the edges of the head chips 12 and the shallow narrow grooves M are formed along the edges of the head chips.

Figure 4:
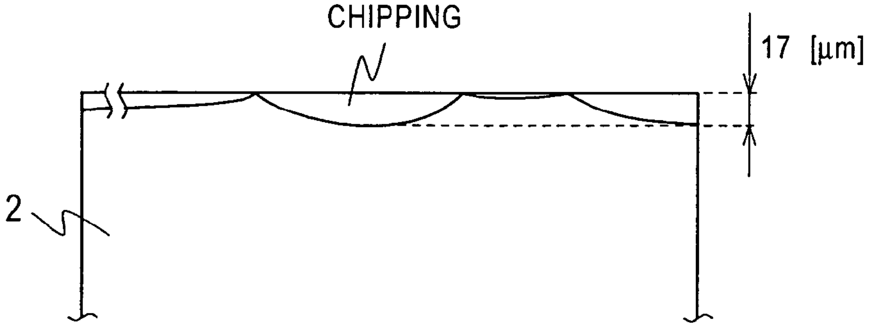
FIG. 4 is a plan view illustrating chipping.
Figure 8:
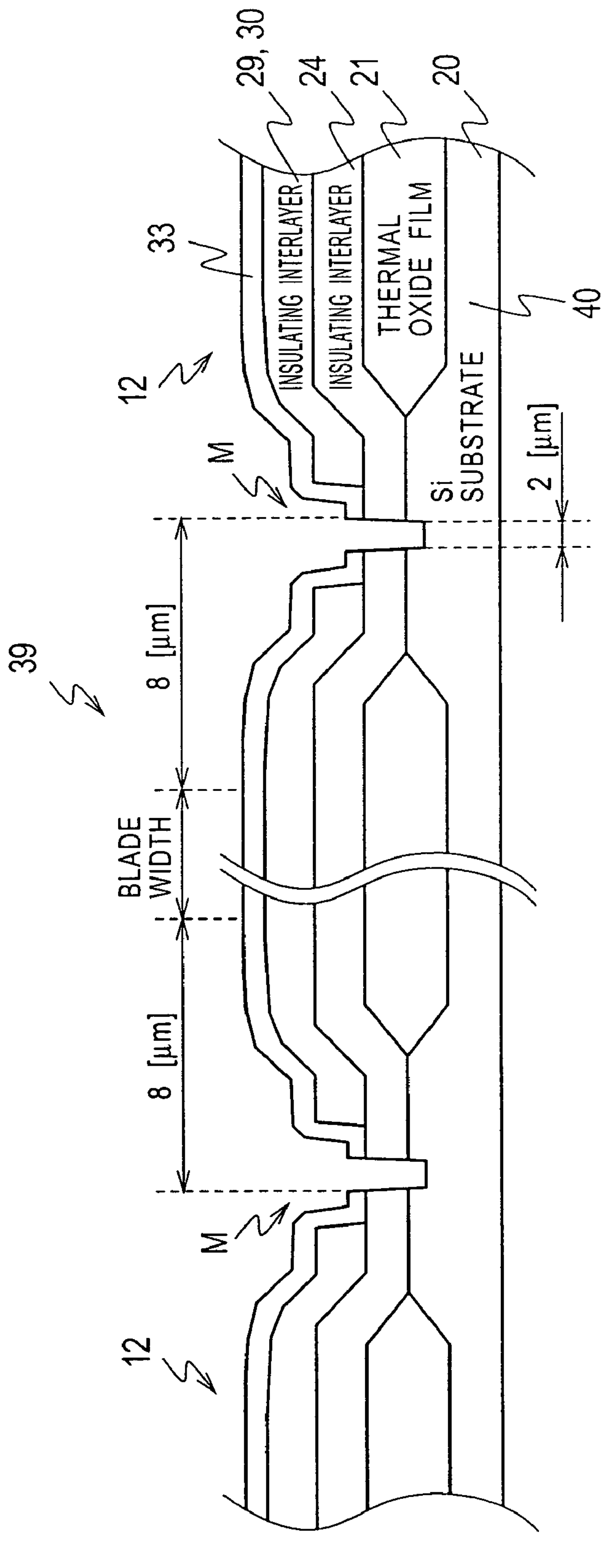
FIG. 8 is a cross-sectional view showing the cutting region of the head chips shown in FIG. 6 on the silicon wafer.

FIG. 8 shows the section A in FIG. 7(B) partly enlarged. When a blade is placed at the center of the cutting regions 39 on the silicon wafer 40, the distance between grooves M is set to include margins of 8 μm on both sides of the blade. Thus, according to this embodiment, the cutting regions 39 are set narrower than the cutting regions 3 shown in FIG. 4 described above as a known technique, and thus the head chips 12 are formed more densely on the silicon wafer 40.

On the silicon wafer 40, the region for isolating devices, namely the thermal silicon oxide film 21, the first insulating interlayer 24, the second insulating interlayer 29, and the insulating film 30 and 33 are sequentially formed also on the cutting regions 39 during processing of the head chip 12. In this manner, no level difference occurs between the head chip 12 and the cutting regions 39 during the above-mentioned steps of forming and patterning films, and the steps of patterning or the like on the head chip 12 can be performed with high accuracy.

The grooves M are formed by partly removing the insulating interlayer 24 and 29, and the insulating films 30 and 33. Before the thermal silicon oxide film 21 is formed, the portions of the silicon wafer 40 on which the grooves M are formed are masked by silicon nitride films so that the thermal silicon oxide film 21 is not provided on the portions for forming the grooves M. The insulating interlayer 24 on the portions for forming the grooves M is removed in the step of forming contact holes in the insulating interlayer 24. The insulating interlayer 29 and the insulating film 30 on the portions for forming the grooves M are also removed in the steps of forming contact holes in the insulating interlayer 29 and the insulating film 30. The insulating film 33 on the portions for forming the grooves M is removed in the step of exposing the lands for the power supply, the ground, and various driving signals after forming the insulating film 33.

In the process of forming the head chip, reticles are prepared for patterning the insulating interlayer 24, the insulating interlayer 29, the insulating film 30, and the insulating film 33 so that the grooves M are formed during these patterning steps. Therefore, the grooves M are formed without additional steps according to this embodiment. The width of the grooves M is designed to be 2 μm at the deepest position.

1.2 Operation of First Embodiment

In the structure described above, the printing head 11 according to this embodiment (shown in FIG. 5) is completed as follows: The transistors 22 and 23, the heating devices 17 and the like are sequentially formed on the silicon wafer 40; the wafer is cut with a dicing machine into the individual head chips 12 (shown in FIG. 6); the dry film 13 is press-bonded to the head chip 12 and processed; and the orifice plate 14 is provided to form the ink chambers 15, the ink passage 16, and the like.

In the printing head 11, ink is introduced to the ink chambers 15 formed as mentioned above through the ink passage 16 formed at the side of the head chip 12. The droplets from ink contained in the ink chambers 15 are ejected from the nozzles 19 by driving the heating devices 17 with the transistors 22 and 23, and land on a target, for example, paper.

When chipping occurs at the side to which the ink is introduced, the fluid resistance in the ink passage connected to the ink chambers 15 changes. This change appears in the meniscus and the volume of ink droplets at the successive nozzles varies, resulting in low image quality. When cracking occurs, the ink penetrates into the head chip from the side of the ink passage 16, and the performance of the transistors 22 and 23 will become unstable. In contrast, when the chipping fragments due to cutting remain on the surface, the fragments are press-bonded to the head chip 12 with the dry film 13 and damage the surface of the head chip 12. In the case of severe damage, the fragments may be pushed into the head chip 12 and cause damage such as a breaking of wires.

In this manner (FIGS. 7 and 8), the head chips 12 are aligned on the silicon wafer 40 so that the heating devices 17 on one chip face those on another chip, the cutting regions 39 are formed between the head chips 12, and the shallow grooves M are formed along the cutting regions 39. Due to the grooves M, cracking and chipping on the head chip 12 are reduced when the cutting regions 39 are cut with a dicing machine for forming the head chips 12.

Since the grooves M are formed on either side of the cutting regions 39 as mentioned above, the shearing stress is concentrated on the area between the grooves M, and cracking and chipping stop at the grooves M. Therefore, propagation of cracking and chipping to the head chip 12 can be prevented.

In this embodiment, since such grooves M are formed along the rows of the heating devices 17, cracking and chipping can be prevented at the side of the head chip 12 which is in contact with ink, and therefore the penetration of ink into the head chip 12 and changes in fluid resistance in ink passage can be prevented.

The size of the resulting products of chipping, namely chipping fragments, is small, so that the fragments can be washed away from the surface of the head chip 12 with distilled water to reduce the damage caused by the fragments.

In the manner according to this embodiment, various types of damage due to cracking and chipping can be prevented even during high-speed dicing, and therefore, productivity is improved.

In this embodiment, the residual stress of the cutting segments in the insulating interlayer 29, for example, is relieved by heat-treatment before cutting. Accordingly, even when the tip of the blade of the dicing machine impacts the silicon wafer 40 at high speed, chipping and cracking on the silicon wafer 40 are significantly reduced compared to the known process. In this manner, various types of damage due to cracking and chipping can be prevented even during high-speed dicing.

In the head chip 12, insulating films are partly removed to form grooves M in the steps of patterning the insulating interlayer 24, the insulating interlayer 29, and the insulating film 30 to form the contact holes, and in the step of patterning the insulating film 33 to expose the lands for the power supply or the like. Thus, the grooves are efficiently formed without increasing the number of processing steps, and various types of damage due to cracking can be prevented by the grooves M.

Since heat-treatment is performed simultaneously during the heat-treatment of the transistors 22 and 23 for stabilizing the performance, a further annealing step is not required.

Figure 1:
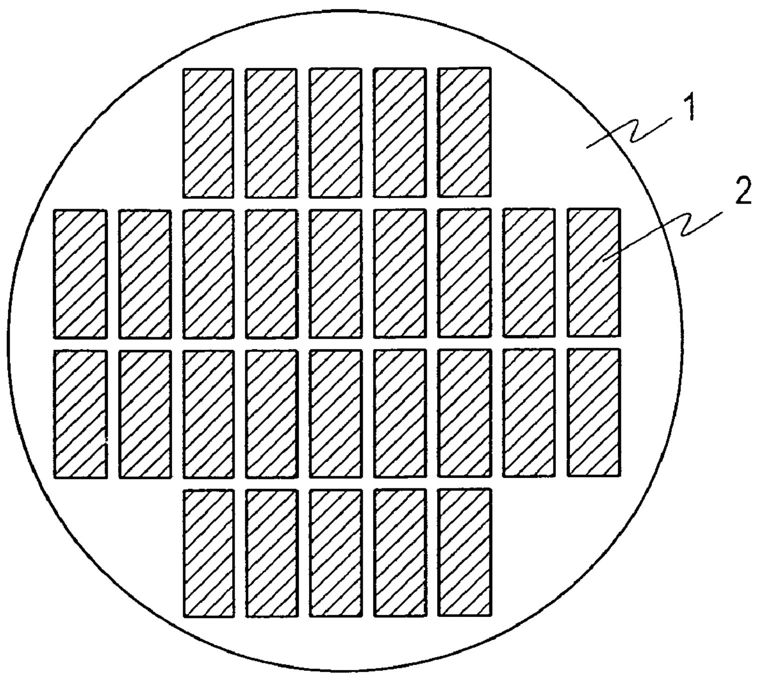
FIG. 1 is a plan view showing the layout of head chips on a silicon wafer.
Figure 2:
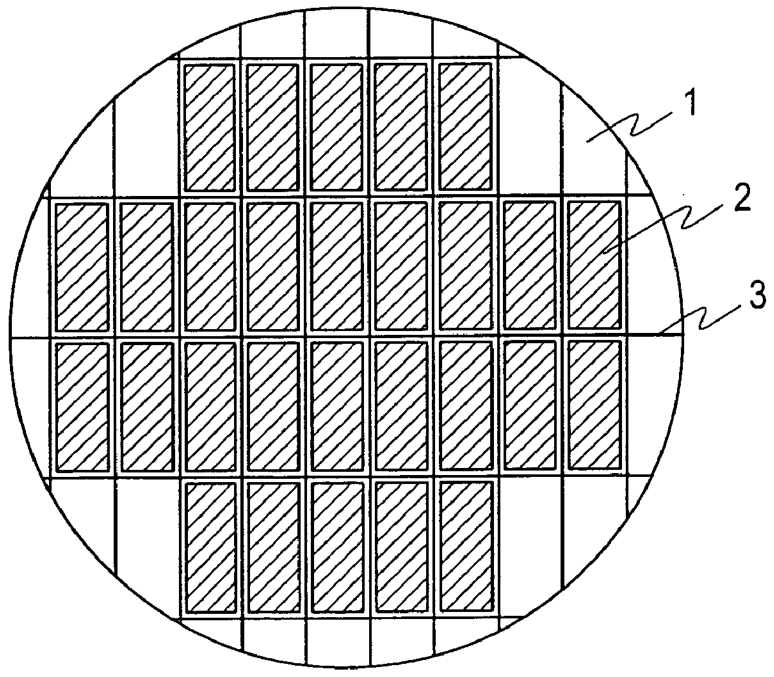
FIG. 2 is a plan view illustrating cutting of the head chips.
Figure 3:
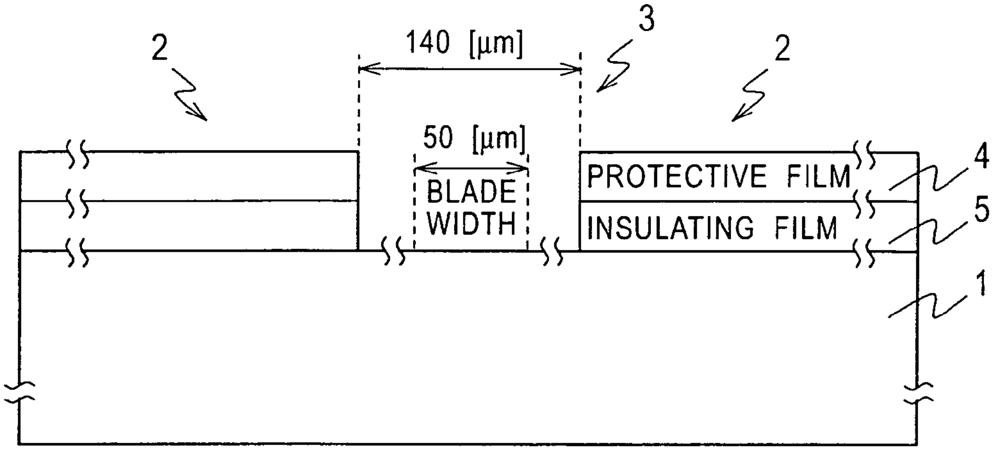
FIG. 3 is a cross-sectional view illustrating cutting regions.

When a wafer was cut under the conditions described with reference to FIG. 3, only microscopic chipping was observed on the edge of the cut surface. When the chipped portion was magnified, it was found that the chipping propagation was blocked at the grooves M.

1.3 Effects of First Embodiment

According to the structure above, various types of damage due to cracking and chipping can be prevented on the head chip 12, even during high-speed dicing, by removing the insulating films to form the shallow grooves along the edges of the head chip 12 including the rows of the energy transducers, namely heating devices 17.

Since the insulating films to be removed function as the insulating interlayers for wiring patterns, the grooves are also formed during patterning of the insulating interlayers.

Since the insulating films to be removed function as protective films between the energy transducers, namely heating devices, and ink, the grooves are also formed during patterning of the protective films to expose the lands.

By the heat-treatment step for relieving the residual stress in the insulating films before cutting, cracking and chipping is further reduced, and therefore, various types of damage due to cracking and chipping can be further prevented.

2. Second Embodiment

Figure 9:
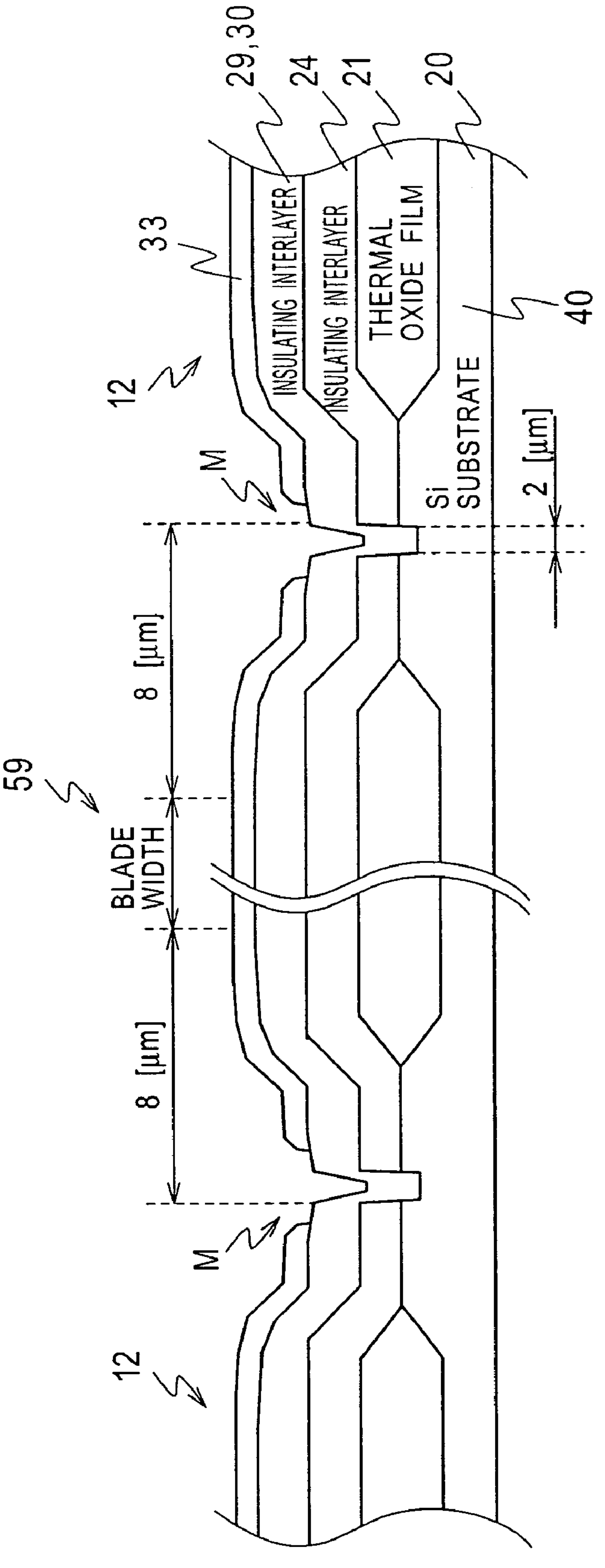
FIG. 9 is a cross-sectional view showing the cutting region of the silicon wafer according to a second embodiment of the present invention.

FIG. 9 is a cross-sectional view showing the cutting region 39 between the head chips 12 applied to a second embodiment of the present invention compared to FIG. 8. In the embodiment, the grooves M are formed by removing the insulating film 30 and 33. Since the embodiment has the same structure as the first embodiment except for the steps to form the grooves M, a duplicated explanation will be omitted.

In the embodiment, the thermal oxide film 21 is not formed on the portions for forming the grooves M on the silicon wafer 40. The insulating interlayer 24 on the portions for forming the grooves M is removed during forming of the contact holes in the insulating interlayer 24. The insulating film 33 on the portions for forming the grooves M is also removed during exposing of the lands. Accordingly, the grooves M formed in this embodiment are shallower than those in the first embodiment.

According to the structure of the second embodiment, forming the grooves by partly removing the insulating films achieves the same effects as the first embodiment.

3. Other Embodiments

Figure 10:
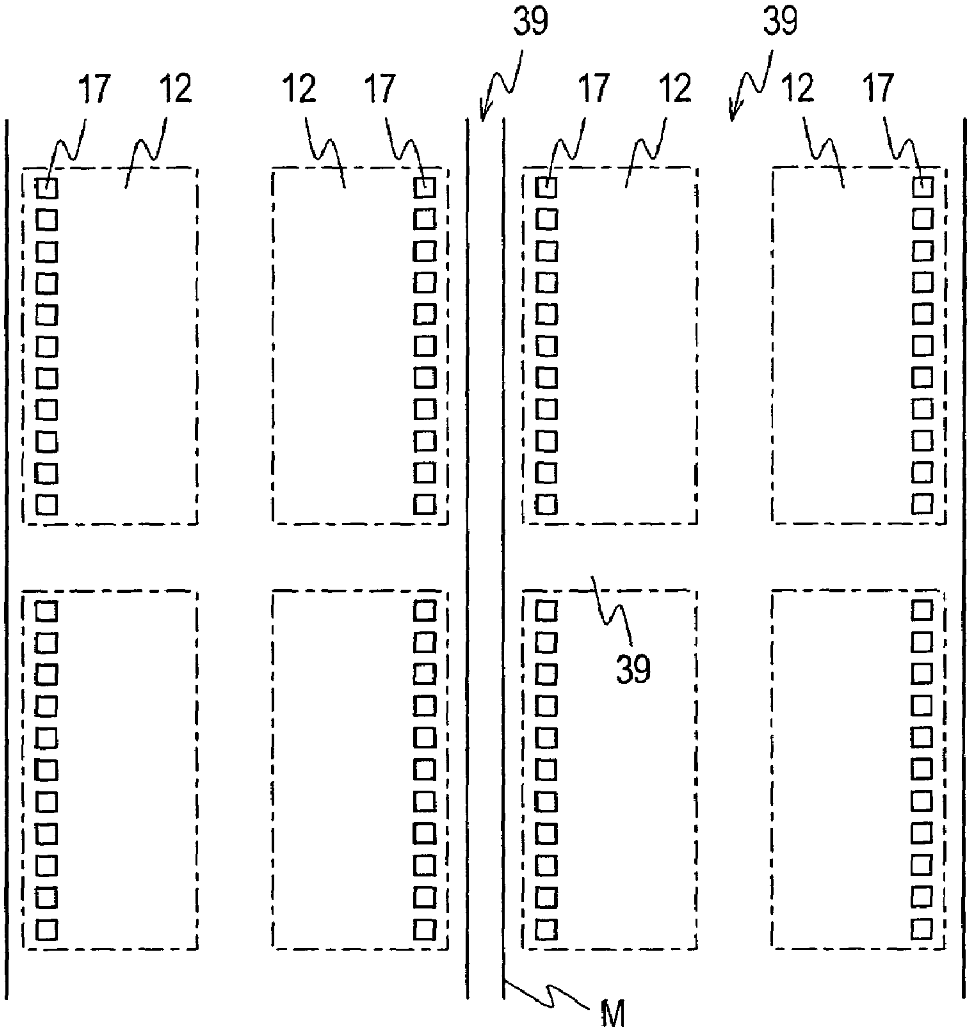
FIG. 10 is a plan view illustrating the layout of the head chips according to another embodiment of the present invention.

The present invention is not limited to the above embodiments in which cracking and chipping are reduced at all the side faces of a head chip by forming grooves on either side of the cutting regions. A groove M may be formed only along each row of the heating devices 17 if necessary. As shown in FIG. 10, for example, grooves M are formed only on the portions along the rows of the heating devices 17, and sufficient spaces are allocated for the cutting regions on which the grooves M are not formed. In this arrangement, cracking and chipping can be reduced by the grooves M at the side to which ink is supplied, and therefore penetration of ink and a change in fluid resistance in the ink passage can be prevented.

Figure 11:
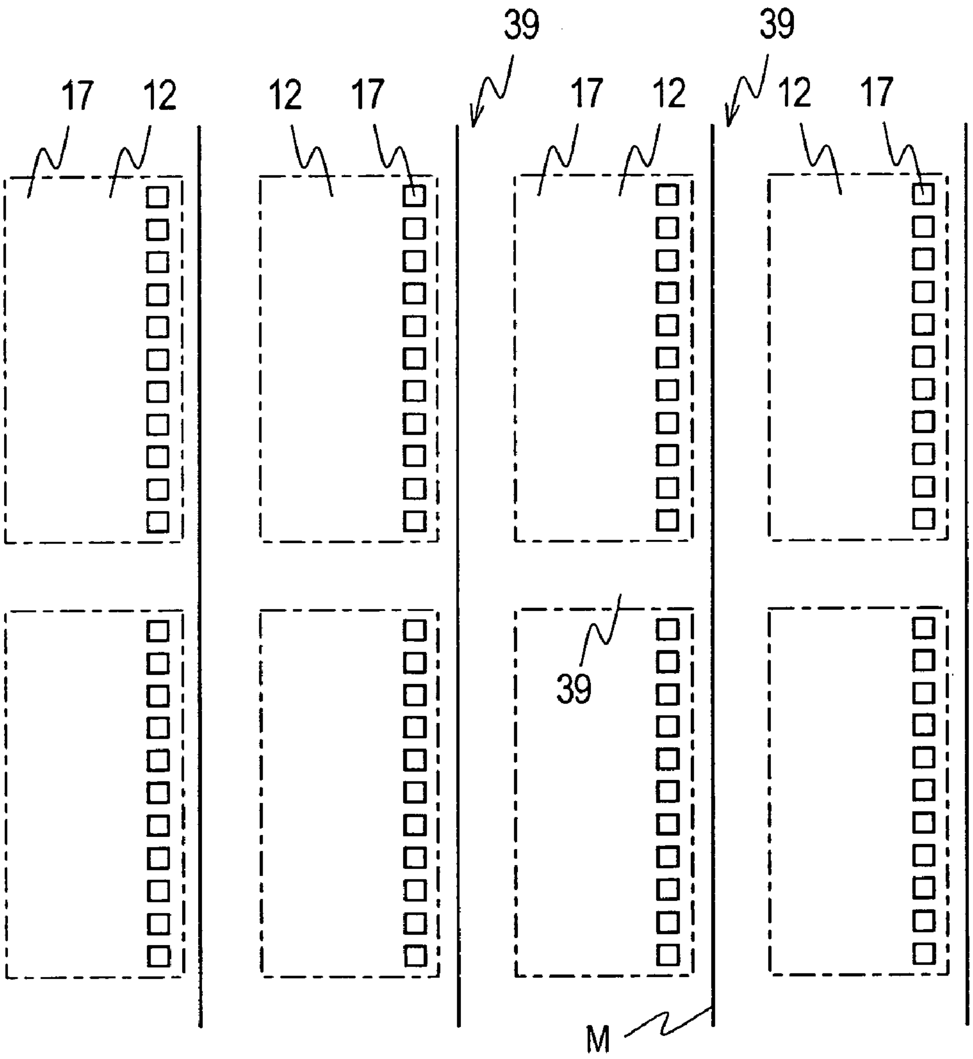
FIG. 11 is a plan view in which all the head chips are aligned in the same direction.

The present invention is not limited to the above embodiments in which heating devices on a chip are aligned to face those on the adjacent chip. All the head chips may be aligned in the same direction, as shown in FIG. 11 compared to FIG. 7. In this case, a groove M may be formed only at the cutting regions adjacent to the heating devices 17.

The present invention is not limited to the above embodiments in which heat-treatment is performed after forming the uppermost layer, that is, the insulating film 33. Since the heat-treatment before dicing reduces cracking or the like, the heat-treatment may be performed in any step before dicing, if necessary. When cracking or the like is allowable, the heat-treatment can be omitted.

The present invention is not limited to the above embodiments in which a logical circuit includes MOS transistors. The present invention is also applicable to logical circuits which include bipolar transistors.

The present invention is not limited to the above embodiments in which a driving circuit and energy transducers are integrated on a head chip. The present invention is also applicable to the head chip which includes the energy transducers alone.

The present invention is not limited to the above embodiments in which heating devices function as energy transducers. Various types of energy transducers can be used in another embodiment. Electrostatic actuators that change the pressure in ink chambers by static electricity, for example, may function as energy transducers.

The present invention is not limited to the above embodiments involving a printing head which ejects ink droplets. The present invention is also applicable to printing heads which eject dye droplets, droplets for forming protective layers, or the like, instead of ink droplets; microdispensers, measuring units, or testing units which eject droplets of reagents or the like; pattern-drawing units which eject droplets of agents that protect target components during etching; and the like.

According to the present invention described above, various types of damage due to cracking and chipping can be prevented by removing the insulating films to form shallow grooves along at least the rows of the energy transducers even during high-speed dicing.

INDUSTRIAL APPLICABILITY

The present invention relates to liquid-ejecting heads, liquid-ejecting apparatuses, and methods for manufacturing the liquid-ejecting heads, and relates to, for example, a thermal printing head.

The invention claimed is:

1. A method for manufacturing a liquid-ejecting head for ejecting droplets by driving energy transducers, comprising:

a forming step of forming a row of a plurality of the energy transducers on a semiconductor substrate;

a cutting step of cutting the semiconductor substrate along the row of the energy transducers to form a head chip;

an assembling step of assembling the head chip into the liquid-ejecting head;

a removing step of removing an insulating film for forming a groove on the head chip parallel to at least a side face along which the energy transducers are provided before the cutting step; and an annealing step for relieving residual stress in the insulating film.

2. The method for manufacturing the liquid-ejecting head according to claim 1, wherein the insulating film is an insulating interlayer for a wiring pattern, and the removing step of the insulating film is a patterning step of the insulating interlayer.

3. The method for manufacturing the liquid-ejecting head according to claim 1, wherein the insulating film is a protective film prepared between the energy transducers and the liquid, and the removing step of the insulating film is a patterning step of the protective film.

* * * * *